United States Patent
Parrault

(10) Patent No.: US 9,094,255 B2
(45) Date of Patent: Jul. 28, 2015

(54) METHOD AND DEVICE FOR AMPLITUDE MODULATION OF AN ELECTROMAGNETIC SIGNAL EMITTED BY A CONTACTLESS TRANSCEIVER SYSTEM

(75) Inventor: Olivier Parrault, Antibes (FR)

(73) Assignee: ASK S.A., Sophia Antipolis (FR)

( * ) Notice: Subject to any disclaimer, the term of this patent is extended or adjusted under 35 U.S.C. 154(b) by 433 days.

(21) Appl. No.: 13/462,085

(22) Filed: May 2, 2012

(65) Prior Publication Data

US 2012/0280794 A1    Nov. 8, 2012

(30) Foreign Application Priority Data

May 2, 2011    (FR) ...................................... 11 01354

(51) Int. Cl.
| | |
|---|---|
| *H04L 27/20* | (2006.01) |
| *H04L 27/04* | (2006.01) |
| *H04L 25/49* | (2006.01) |
| *G06K 7/10* | (2006.01) |
| *H04B 5/00* | (2006.01) |

(52) U.S. Cl.
CPC ............. *H04L 27/04* (2013.01); *G06K 7/10009* (2013.01); *H04L 25/4906* (2013.01); *H04L 27/2046* (2013.01); *H04B 5/0031* (2013.01)

(58) Field of Classification Search
CPC ............ G06K 7/0008; G06K 19/0723; G06K 7/10237; H04B 5/02; H04B 5/0062; H04B 5/0056; H04W 4/008
USPC .................................................. 375/279, 308
See application file for complete search history.

(56) References Cited

U.S. PATENT DOCUMENTS

| | | | |
|---|---|---|---|
| 2004/0051627 A1 | 3/2004 | Parrault ........................ 340/10.1 |
| 2005/0275980 A1* | 12/2005 | Coleman ......................... 361/20 |
| 2006/0111043 A1* | 5/2006 | Wuidart ....................... 455/41.1 |
| 2008/0278329 A1 | 11/2008 | Kim et al. ................... 340/572.4 |
| 2009/0010360 A1 | 1/2009 | Murdoch ...................... 375/302 |
| 2011/0133895 A1* | 6/2011 | Wu et al. ...................... 340/10.1 |
| 2012/0112887 A1* | 5/2012 | Horne et al. ................. 340/10.1 |

* cited by examiner

*Primary Examiner* — Don N Vo
(74) *Attorney, Agent, or Firm* — James C. Lydon

(57) ABSTRACT

The invention concerns a method for partial amplitude modulation of a carrier wave between 8% and 14%, the carrier wave being emitted by a contactless transceiver device (10) designed to remotely exchange data with a contactless portable object, the method comprising:
- a) delivering two digital radiofrequency signals Tx1 (20) and Tx2 (22),
- b) phase shifting the second signal Tx2 by 180 degrees in relation to the first signal Tx1 when there is no information to be transmitted (idle state),
- c) phase shifting the two Tx2 signals in relation to Tx1 or Tx1 in relation to Tx2 by an additional angle φ when there is information to be transmitted (modulated state),
- d) having the digital signals pass through a filtering and adapting stage (13),
- e) adding, at the antenna, the first and second filtered and phase-modulated signals (Tx1*f* and Tx2*f*) and obtaining an amplitude modulated resultant radiated signal.

17 Claims, 2 Drawing Sheets

Figure 1:
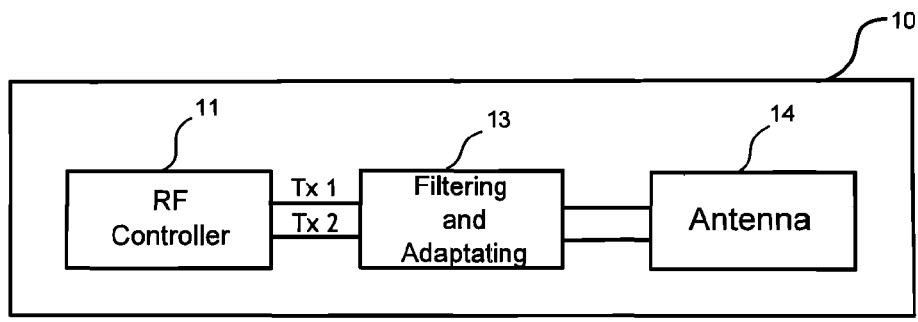

METHOD AND DEVICE FOR AMPLITUDE MODULATION OF AN ELECTROMAGNETIC SIGNAL EMITTED BY A CONTACTLESS TRANSCEIVER SYSTEM

This invention concerns electromagnetic signal modulating devices for contactless transceiver devices designed to transmit electromagnetic signals to contactless portable devices, and specifically concerns a method and device for amplitude modulation of an electromagnetic signal transmitted by a contactless transceiver system.

The exchange of information between a contactless object and a contactless transceiver device is generally accomplished by remote electromagnetic coupling between a first antenna located in the contactless transceiver device and a second antenna housed in the contactless object. The portable object is equipped with an electronic module featuring the second antenna connected to an electronic chip which contains, among other elements, a radiofrequency (RF) section, a microprocessor and/or a memory wherein is stored the information to be provided to the contactless transceiver device and the logic functions required to compile the information to be transmitted and to process the information received.

The contactless objects may be of different types such as an access ticket, a card in credit card format, an electronic passport, etc. Data transmissions between the contactless transceiver system, commonly referred to as the coupler or reader, and the contactless objects are subject to ISO standards. Among the most widely spread standards, ISO 14443 concerns data transmission via radio communication between a smart card and a reader and vice versa. This standard covers two transmission protocols known as type "A" transmission protocol and type "B" transmission protocol. These two contactless data transmission protocols, type A and B, differ in terms of the modulation type used for radiofrequency (RF) communication between the reader and the card on the one hand, and the card and the reader on the other hand. In order to transmit data to contactless cards, the carrier wave is 100% modulated in the case of type A protocol whereas the carrier wave is 10% modulated in the case of type B protocol.

This type of 10% modulation is also used for type B' contactless object readers (ISO 14443-2 type B signal modulation with Innovatron proprietary protocol), Sony Felica, ISO 18092 (NFC) and ISO 15693.

These two types of modulation are usually performed inside a radiofrequency controller (RF controller) integrated circuit located in the contactless transceiver device.

Unlike 100% modulation generally obtained by the temporary shutdown of the carrier generator of the RF controller, partial 10% modulation is more tricky to obtain. The RF controller most often performs this modulation between 0% and 10% by varying the impedance of its output stage according to two values. However, the impedance of the output stage of the RF controller of the transceiver device must be adapted to the impedance of the antenna located downstream from the controller so that the total impedance of the transceiver device varies according to 2 values such that the radiated signal is 0% and 10% modulated. As a result, the impedance values of the output stage of the controller must be adjusted according to the antenna and the environment of the reader, which represents a drawback.

Furthermore, the 10% modulation must be as stable as possible so as to remain within the authorized range of 8% to 14%, and, what's more, in the presence of any type of contactless portable object, hence regardless of the load. In the presence of cards, the total impedance depends on the impedance of the controller, the impedance of the antenna, the variable coupling according to the distance between the antenna of the card and the antenna of the transceiver device, and the impedance of the card. As a result, a card placed in the RF field radiated by the contactless transceiver device results in a modification of the impedance of the transceiver device antenna and of the total impedance and thus in a variation of the modulation factor. A drawback resides in the fact that with each time the antenna is configured, the user has to adjust the impedance levels of the output stage of the RF controller to obtain 10% modulation which is acceptable by the standard. This also represents a drawback as it renders the antenna inseparable from the transceiver device and the RF controller. Solutions exist to render the 10% modulation constant. They consist in adding amplification stages having a fixed output impedance insensitive to downstream impedance variations induced by load variation. Producing such systems is complex. Furthermore, when they are linear, these amplification stages have a high power consumption.

This is why the purpose of the invention is to provide a method for partial amplitude modulation with a modulation factor between 8% and 14% of a carrier wave emitted by a contactless transceiver device, the modulated amplitude of which does not vary as a function of the transmission antenna impedance and also does not vary in the presence of the portable contactless object communicating with the contactless transceiver device.

The purpose of the invention is therefore a method for partial amplitude modulation of a carrier wave at a factor between 8% and 14%, the carrier wave being emitted by a contactless transceiver device designed to remotely exchange data with a contactless portable object. The method consists in:

a) delivering two digital radiofrequency signals Tx1 and Tx2 at the frequency of 13.56 MHz, b) phase shifting the second Tx2 signal by 180 degrees in relation to the first Tx1 signal when there is no information to be transmitted from the contactless transceiver device to the contactless portable object (idle state), c) phase shifting the two Tx2 signals in relation to Tx1, or Tx1 signals in relation to Tx2, by an additional angle $\phi$ when there is information to be transmitted from the contactless transceiver device to the contactless portable object (modulated state), d) passing the digital signals in a filtering and adapting stage, e) adding the first and second filtered and phase-modulated signals (Tx1$f$ and Tx2$f$) and obtaining a resulting signal radiated by the amplitude modulated antenna.

Another purpose of the invention is a contactless transceiver device designed to remotely exchange data with a contactless portable object comprising a radiofrequency controller delivering two symmetrical digital waves Tx1 and Tx2 from a 13.56 MHz input signal emitted by a clock, means to phase shift the two signals by 180 degrees in relation to one another when there is no information to transmit (idle state) from the contactless transceiver device to the contactless portable object, means to phase shift the two signals in relation to one another by an additional angle $\phi$, in absolute value, when there is information to transmit from the contactless transceiver device to the contactless portable object (modulated state), means to filter the Tx1 and Tx2 signals, means for adding the two filtered signals Tx1$f$ and Tx2$f$ to obtain, at the antenna, an amplitude modulated resultant signal with a modulation factor between 8% and 14%.

The method according to, the invention and its associated device present the advantage to deliver signals under constant impedance, and thus stable amplitude modulation during operation and, what's more, regardless of the type of antenna of the contactless transceiver device. In this way, each time the antenna is configured, the user does not need to adjust the impedance levels of the output stage of the RF controller to obtain a 10% type modulation which is acceptable by the standard. This presents the advantage of separating the antenna and the RF controller from the contactless transceiver device and thus render them independent of one another.

The method according to the invention and its associated device present the advantage of enabling digital type amplification systems, simpler and requiring less energy than linear amplifiers, to be inserted between the RF controller and the filtering and adapting stage. The amplitude modulation information transmitted at this level by the phase of the Tx1 and Tx2 signals is in fact not affected by the crossing of these amplification systems.

The purposes, objects and characteristics of the invention will become more apparent from the following description when taken in conjunction with the accompanying drawings in which:

FIG. 1 represents a general schematic block diagram of a contactless transceiver device.

Figure 2:
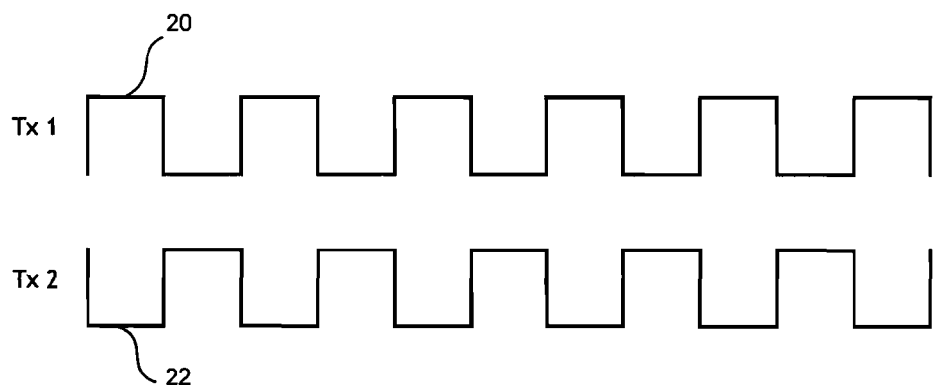
Figure 3:
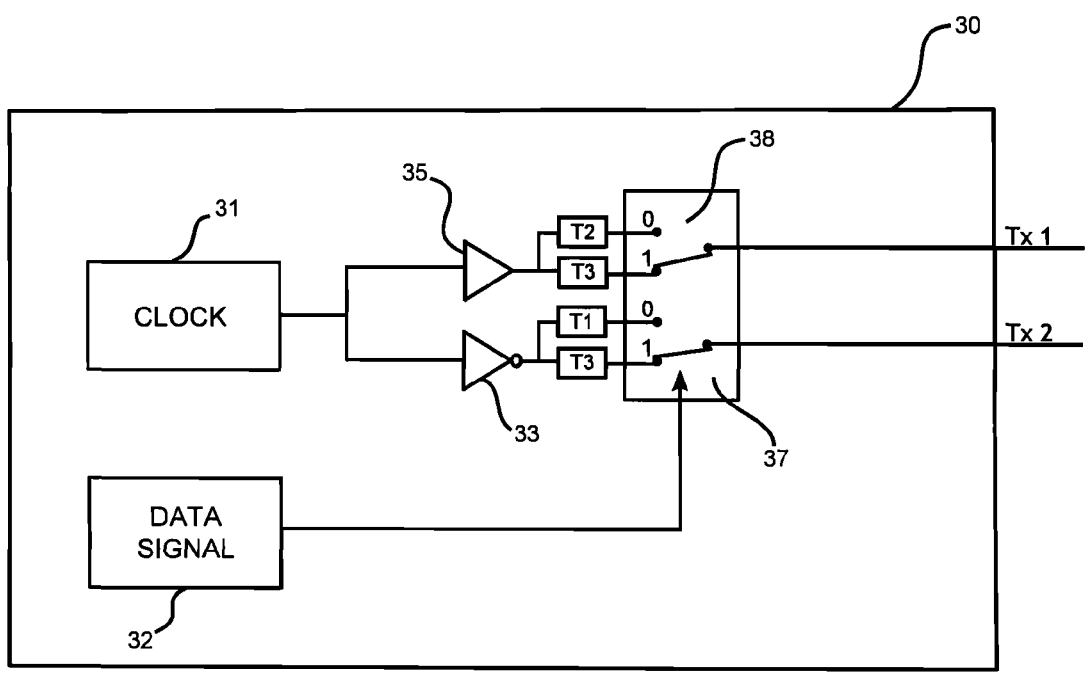
Figure 4:
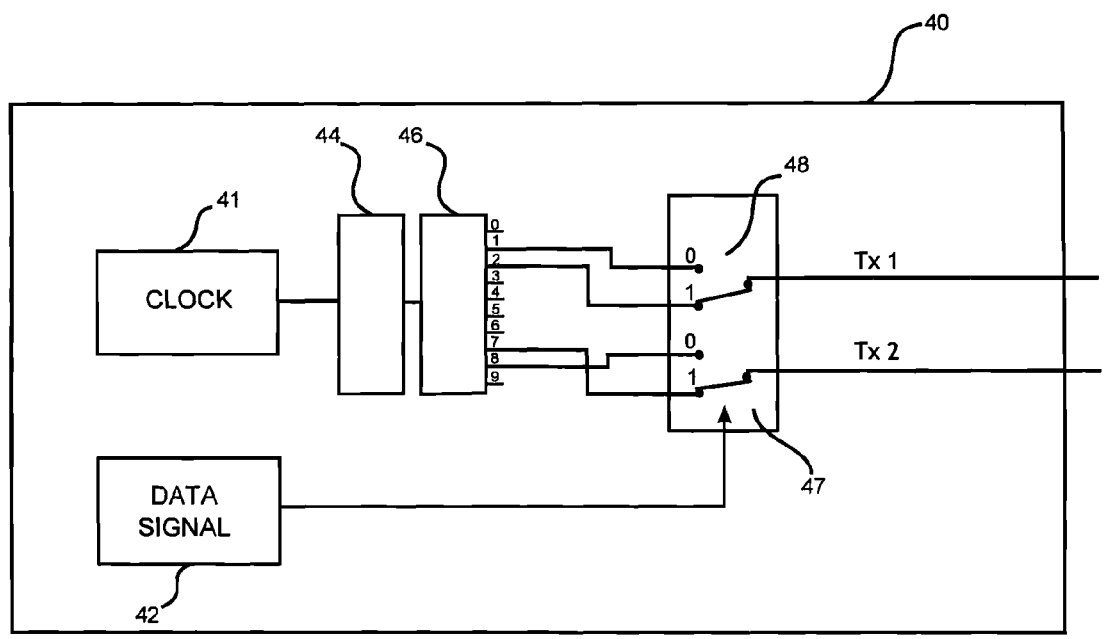
Figure 5:
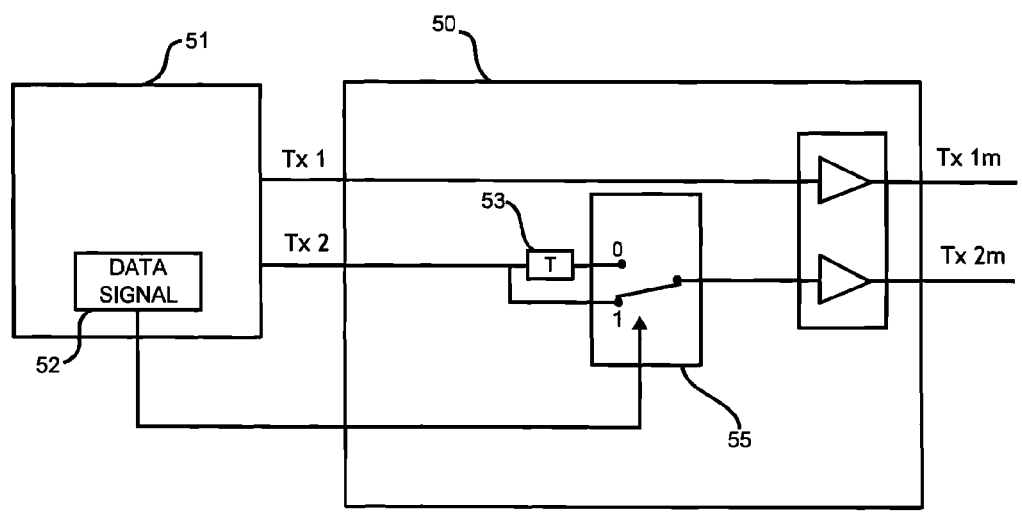

FIG. 2 represents the signals at the output of the radiofrequency controller of the contactless transceiver device according to the invention, FIG. 3 represents a schematic block diagram of a first embodiment of the RF controller of the contactless transceiver device according to the invention, FIG. 4 represents a schematic block diagram of a second embodiment of the RF controller of the contactless transceiver device according to the invention, FIG. 5 represents a schematic block diagram of a third embodiment of the contactless transceiver device according to the invention located outside of an existing RF controller.

The contactless transceiver device according to the invention is referred to as "reader" in the description that follows. According to FIG. 1, the reader 10 features a radiofrequency controller (RF controller) 11 comprising 2 output ports delivering a radiofrequency signal to a transmission antenna 14 designed to communicate with a contactless portable object of the contactless card type. The RF controller is an electronic monitoring and control circuit of the reader which delivers a signal in the form of two digital signals Tx1 and Tx2 at the frequency of 13.56 MHz. In order to transmit data from the reader to the card, the two emitted signals are phase modulated by the RF controller before being transmitted to the filtering and adapting stage 13. The filtering means are inductors and capacitors, for example. The filtered signals Tx1$f$ and Tx2$f$ can thus be exploited by the antenna 14 where they are added. The resultant radiated signal at the antenna 14 is performed according to the modulation standard of the type B transmission protocol. According to this protocol, the resultant signal, also referred to as carrier wave, emitted by the contactless transceiver device is 10% amplitude modulated. As the authorized limits range from 8% to 14% according to the standard governing this modulation, the value selected for the device according to the invention is located within this range and is preferably equal or near the middle value of 11%.

FIG. 2 represents the two signals Tx1 and Tx2 delivered by the two output ports of the RF controller. They are emitted in the form of two rectangular digital (binary) signals with a constant cyclic ratio equal to 50%. In idle state, thus when there is no information to be transmitted, the two signals are phase shifted by 180 degrees which is represented in Figure by Tx2=−Tx1. The idle state corresponds to the transmission of logical "1".

When information is sent toward the card, which corresponds to the modulated state, the RF controller causes an additional phase shift between the two signals Tx1 and Tx2 equal to p in absolute value so that a signal having a modulation factor m=10% is emitted. The modulated state corresponds to the transmission of logical "0" (zero). After passing through the filtering and adapting stage 13 and through the antenna 14, the amplitude of the resultant radiated signal in the antenna is a in the idle state and b in the modulated state. The modulation factor m of the carrier wave radiated by the antenna follows the following formula as stipulated in standard ISO 14443-2:

$$m=(a-b)/(a+b)$$

Assuming the emitted digital signals Tx1 and Tx2 have an amplitude equal to 1, they can be broken down, according to the Fourier series for a square wave signal, into a sum of a main harmonic (Tx1$f$ and Tx2$f$) and secondary harmonics according to the following formula:

$$f(t) = A \cdot \frac{4}{\pi}\left[\sin\frac{\omega t + \sin 3\omega t}{3} + \frac{\sin 5\omega t}{5} + \dots\right]$$

After passing through the filtering and adapting stage, the secondary harmonics are eliminated by this stage. When Tx2 and Tx1 are phase shifted by (180+p) and have an amplitude equal to 1, Tx1$f$ broken down according to the previous formula gives:

$$Tx1f(t) = \frac{4}{\pi}[\sin\omega t]$$

Tx2$f$ thus breaks down according to the formula:

$$Tx2f(t) = \frac{4}{\pi}[\sin\omega t + \pi + \varphi)]$$

The resultant signal is thus:

$$Tx1f - Tx2f = \frac{4}{\pi}[\sin\omega t] - \frac{4}{\pi}[\sin(\omega t + \pi + \varphi)]$$

When there is no data to be transmitted, thus in idle state, Tx2=−Tx1 and φ=0, the resultant signal is:

$$Tx1f - Tx2f = \frac{4}{\pi}[\sin\omega t] + \frac{4}{\pi}[\sin\omega t] = \frac{8}{\pi}\sin\omega t$$

The amplitude of the resultant signal is thus equal to $$a\frac{8}{\pi} =$$

When there is data to be transmitted, thus in the modulated state, Tx2 and Tx1 are phase shifted by a non-zero angle φ, and the resultant signal is:

$$Tx1f - Tx2f = 2\frac{4}{\pi}\cos\frac{\varphi}{2}\sin\left(\omega t + \frac{\varphi}{2}\right)$$

The amplitude of the resultant signal is thus equal to $$b = \frac{8}{\pi}\cos\frac{\varphi}{2}.$$

And, according to the formula of the modulation factor:

$$m=(a-b)/(a+b)$$

we get:

$$m = \frac{\left(1 - \cos\frac{\varphi}{2}\right)}{\left(1 + \cos\frac{\varphi}{2}\right)}$$

According to this formula, the resultant signal at the antenna is amplitude modulated at a modulation factor m dependant on the additional phase shift angle φ.

To obtain the nominal value of a modulation factor m=10% according to the type B transmission protocol of standard 14443, the additional phase shift φ must be equal to 70 degrees. According to the preferred embodiments of the invention wherein the modulation factor is between 8% and 14%, the additional phase shift angle φ is inevitably between 63.2 degrees and 82.1 degrees. Preferably, the additional phase shift angle φ is equal to 73.4 degrees, which corresponds to a modulation factor of 11%.

The additional phase shift φ is obtained according to different embodiments. According to the first and second embodiments of the invention, the modulation means are included in the RF controller. According to the first embodiment of the invention, the additional phase shift is generated as a phase lagging inside the radiofrequency controller circuit. According to FIG. 3, the RF controller circuit 30 of the reader comprises a clock 31 which generates a signal at a frequency of 13.56 MHz. The signal passes through an inverter logic gate 33 and a non-inverter logic gate 35 so that two paths are created which are flipped by 180 degrees in relation to one another. Then, the signals from the two paths are lagged for either a duration T3 identical for the two paths, which retains the 180-degree inversion, or for a duration T1 and T2 respectively in order to obtain an additional phase shift angle φ of 73.4 degrees. The various lags are selected by two switches 37 and 38 controlled by the data signal 32 emitted. The lags T3 are selected when the emitted signal is idle (transmission of logical "1"). The lags T1 and T2 are selected when the emitted signal transmits logical "0".

The 13.56 MHz signal emitted has a period T=1/f=73.7 ns. As the duration of a period corresponds to a phase shift of 360 degrees, it follows that an additional phase shift angle φ of 73.4 degrees corresponds to a duration of 15 ns (nanoseconds). The signal Tx2 must thus be lagged in relation to Tx1 for a duration T2−T1=15 ns to obtain a modulation factor of 11%. To obtain a modulation factor between 8% and 14%, the signal Tx2 must be lagged in relation to Tx1 for a duration between 12.9 ns and 16.8 ns. It is also possible to lag Tx1 in relation to Tx2. The absolute value of the lag between the two signals must be between 12.9 ns and 16.8 ns and preferably equal to 15 ns.

The two phase-modulated signals Tx1 and Tx2 enable amplitude modulation of the resultant signal to be obtained at the antenna according to the modulation standard at 10% of the type B transmission protocol.

According to a second embodiment of the invention, the additional phase shift is generated by multiplication/division of the 13.56 MHz input signal generated inside the RF controller. According to FIG. 4, the RF controller 40 comprises a clock 41 which generates an input signal at a frequency of 13.56 MHz. The signal emitted at 13.56 MHz passes through a frequency multiplier circuit 44 then in a frequency divider circuit 46. The division by n of a periodic signal of frequency f enables n signals shifted 360/n degrees to be obtained. We have seen that to obtain a modulation factor m between 8% and 14%, the additional phase shift angle φ must be (in absolute value) between 63.2 degrees and 82.1 degrees.

By rounding to the nearest degree, the phase shifting between the two signals TX1 and TX2, essential for the purpose of the invention, must be 180 degrees on the one hand, and either between 180°+63° and 180°+82° or between 180°−82° and 180°−63° on the other hand.

The multiplier circuit 44 multiplies the 13.56 MHz input signal by n, then the divider circuit 46 divides the signal of frequency n×13.56 MHz into n 13.56-MHz signals phase shifted 360°/n that will be named P0 to P(n−1). Among these shifted signals, one must simply select two based on the state of the data to be transmitted, the phase difference of which corresponds to that sought. This selection is made owing to the switching circuits 47 and 48 controlled by the data to be transmitted 42.

The presence of signals phase shifted by 180 degrees at the divider 46 is effective for all even values of n.

The presence of signals having the additional φ phase shift in absolute value within the required value ranges is obtained for certain values of n, the first being 5.

In order to facilitate the embodiment, the signals phase shifted by 180 degrees and those with an additional phase shifting of φ in absolute value should be accessible on the same device. In this case, n is even and the smallest value of n satisfying this criterion is 10.

When there is no information to be transmitted from the reader to the contactless portable object (transmission of logical "1"), the phase difference between the two signals will have to be equal to 180 degrees, thus the two signals selected will be two signals Px and P(x+n/2), the phase difference of which is equal to 180 degrees.

When there is information to be transmitted from the reader to the contactless portable object (transmission of logical "0"), the two signals will be such that their phase difference is between 98 degrees and 117 degrees, or between 243 degrees and 263 degrees, so as to obtain an amplitude modulated signal having a modulation factor between 8% and 14%. The signals selected will be two signals Py, and either P(y+n/2+c) or P(y+n/2−c) with n being even so that the additional phase difference p introduced by c (integer) is between 63 degrees and 82 degrees in absolute value.

In all cases, the selection of values x, y and c that meet these criteria enables to deliver at the antenna a carrier that is amplitude modulated between 8% and 14% according to the data to be transmitted.

However, a poor choice of these values may introduce a parasitic phase hop on the resulting radiated carrier at modulation transitions; should this phase hop be high, it may prove problematic for contactless communication. The frequency at 13.56 MHz of the carrier serves as a reference clock for the contactless object.

Only the values of x, y and c that meet the following criteria introduce no parasitic phase hop at the transition from amplitude modulation:

$$x=y+c$$

Or $$x=y-c$$

According to a preferred embodiment of the invention, the additional phase shift angle ϕ is equal to 72 degrees, which corresponds to a modulation factor of 10.53% thus within the interval tolerated by the standard. According to a preferred embodiment, the frequency of 13.56 MHz of the input signal is multiplied, then divided by a factor n=10. In this case, the multiplier circuit 44 multiplies the 13.56 MHz input signal by 10, then the divider circuit 46 divides the 135.60 MHz signal (10×13.56 MHz) by 10 to obtain 10 signals phase shifted by 36 degrees.

A phase signal P0=0 degrees
A phase signal P1=36 degrees
A phase signal P2=72 degrees
A phase signal P3=108 degrees
A phase signal P4=144 degrees
A phase signal P5=180 degrees
A phase signal P6=216 degrees
A phase signal P7=252 degrees
A phase signal P8=288 degrees
A phase signal P9=324 degrees Among these offset signals, all is needed is selecting two signals whose phase difference corresponds to that sought based on the data 42 to be transmitted. This selection is made, for example, through a circuit of switches 47 and 48. In particular, when there is no information to be transmitted (transmission of logical "1"), the phase difference between the two signals must be equal to 180 degrees, thus the two signals selected among the 10 signals P0 to P9 shifted by 36 degrees will be, for example, the two phase signals P7=252 degrees and P2=72 degrees. Furthermore, when there is information to be transmitted toward the card, the two signals Tx1 and Tx2 chosen will be selected through switches 47 and 48 so that their phase shift will be equal to 252 degrees (180°+72°) to obtain an amplitude modulated signal having a modulation factor equal to 10.53%. The two signals Tx1 and Tx2 selected will be, for example, signals with a phase of P1=36 degrees and P8=288 degrees. When there is information to be transmitted to the card, thus in the presence of logical "0", the choice of the two signals Tx1 and Tx2 advances Tx1 by 36 degrees and lags Tx2 by 36 degrees in relation to the signals Tx1 and Tx2 present when there is no information to be transmitted or when the data to be transmitted is 1. This choice guarantees that the resultant signal does not shift in phase during amplitude modulation transition, in other words that there is no parasitic phase rotation on the carrier wave emitted by the antenna. The multiplier circuit 44 may consist of a phase locked loop (PLL) stage.

The two phase-shifted signals Tx1 and Tx2 enable modulation of the resultant signal to be obtained at the antenna as per the 10% modulation standard of the type B transmission protocol.

The first two embodiments are accomplished through modulation means implemented inside the RF controller, and which can be integrated in the silicon of an RF controller circuit. Thus, the 10% modulation factor is guaranteed when the RF controller is manufactured since the modulation device described is built directly into the RF controller. The two signals Tx1 and Tx2 at the output of the RF controller are thus phase shifted by 180 degrees in the idle state and by 180°+ϕ or 180°−ϕ in the modulated state.

However, similar modulation means can be made on the outside of an existing RF controller 51 as illustrated in FIG. 5 and according to a third embodiment of the invention. In this case, the type B modulation generated by modulation of the output impedance Tx1 and TX2 of the controller is not used. The type B data to be transmitted is routed to an output port of the RF controller. According to a third embodiment of the invention, the partial modulation method is implemented in an external circuit at the output of the RF controller circuit 51. The additional phase shift is thus generated or not depending on the data to be transmitted with a lag thanks to the electronic circuit 50 illustrated in FIG. 5. The RF controller circuit 51 generates the digital radiofrequency signals Tx1 and Tx2 at 13.56 MHz, and delivers the type B data 52 to be transmitted to one of its output ports. On common RF controllers, the signal TX2 is generally already available phase shifted by 180 degrees in relation to TX1. The signal Tx2 passes through a circuit 53 which enables the signal Tx2 to be lagged by a duration T1 in relation to Tx2. The signal TX2 or the lagged signal TX2 is selected by a switch 55 based on the data 52 to be transmitted. To ensure a stable and the lowest possible output impedance for the signals TX1m and TX2m output by the device, a buffer circuit 54 is added downstream from the switch. The emitted signal of 13.56 MHz has a period of T=1/f=73.7 ns. Given that the duration of a period corresponds to a phase shift of 360 degrees, it follows that an additional phase shift angle ϕ de 73.4 degrees, corresponding to the middle value of the interval [8%; 14%] of the authorized modulation factor, corresponds to a duration of 15 ns (nanoseconds). The signal Tx2 must thus be lagged by a duration T1=15 ns in relation to Tx1 to obtain a modulation factor of 11%. To obtain a modulation factor between 8% and 14%, the signal Tx2 must be lagged in relation to Tx1 for a duration between 12.9 ns and 16.8 ns.

The two phase-shifted signals Tx1m and Tx2m, obtained at the output of the device, after passing through the filtering and adapting stage, enable modulation of the resultant signal to be obtained at the antenna, which complies with the 10% modulation standard of the type B transmission protocol. The embodiment described in FIG. 5 of the third embodiment is based on one of the simplest architectures enabling to obtain the method and the device according to the invention.

This embodiment generates parasitic phase hops in the order of 18 degrees at the 10% modulation transitions of the 13.56 MHz signal radiated by the antenna.

The amplitude of these phase hops is sufficiently low so as not to affect the operation of the internal clock of the contactless objects presented or reader equipped with this device.

The invention claimed is:

1. A method for partial amplitude modulation of a carrier wave at a factor between 8% and 14%, the carrier wave being emitted by a contactless transceiver device designed to remotely exchange data with a contactless portable object, comprising:
   a) delivering two digital radiofrequency signals Tx1 (20) and Tx2 (22) at the frequency of 13.56 MHz,
   b) phase shifting the second Tx2 signal by 180 degrees in relation to the first Tx1 signal when there is no information to be transmitted from the contactless transceiver device to the contactless portable object (idle state),
   c) phase shifting the two Tx2 signals in relation to Tx1 or Tx1 in relation to Tx2 by an additional phase shift ϕ when there is information to be transmitted from the contactless transceiver device toward the contactless portable object (modulated state), d) having the digital signals pass through a filtering and adapting stage (13), e) adding the first and second filtered and phase-modulated signals (Tx1*f* and Tx2*f*) and obtaining a resultant signal amplitude modulated between 8% and 14%.

2. The method according to claim 1 wherein said two signals Tx1 and Tx2 are emitted in the form of two rectangular digital (binary) signals with a constant cyclic ratio equal to 50%, said signals Tx1 and Tx2 being generated by a radiofrequency controller circuit (11, 30, 40, 51) from a 13.56 MHz input signal emitted by a clock (31, 41).

3. The method according to claim 2, wherein phase shifting steps b) and c) are obtained:

by multiplying said 13.56 MHz input signal generated by the clock (41) of the RF controller (40) by a factor n, by dividing the signal obtained in the previous step by n in order to obtain n signals phased shifted by 360/n degrees, by selecting two signals Tx1 and Tx2 among the n signals obtained in the previous step such that Tx1 and Tx2 are shifted by 180 degrees when no information is to be transmitted from the contactless transceiver device to the contactless portable object (idle state), and by selecting two other signals shifted by 180+ϕ degrees 180−ϕ degrees when there is information to be transmitted from the contactless transceiver device to the contactless portable device (modulated state).

4. The method according to claim 3, wherein the factor n is equal to 10 and said two signals Tx1 and Tx2 are selected among the 10 signals P0 to P9 phase shifted by 36 degrees so as to be phase shifted 180 degrees when there is no information to be transmitted from said contactless transceiver device to the contactless portable object, and are selected so as to be phase shifted by 252 degrees when there is information to be transmitted from said contactless transceiver device to the portable contactless object.

5. The method according to claim 2, wherein the method is implemented inside said radiofrequency controller circuit (11, 30, 40) of the contactless transceiver device (10).

6. The method according to claim 2, wherein the method is implemented in an exterior circuit (50) on the output of said radiofrequency controller circuit (51) of said contactless transceiver device (10).

7. The method according to claim 1 wherein the amplitude modulated resultant signal has a modulation factor m dependent on the additional phase shift angle ϕ according to the following formula:

$$m = \frac{(1 - \cos\frac{\varphi}{2})}{(1 + \cos\frac{\varphi}{2})}.$$

8. The method according to claim 7 wherein said additional phase shift ϕ is between 63.2 degrees and 82.1 degrees.

9. The method according to claim 8, wherein said additional phase shift ϕ is equal to 73.4 degrees.

10. The method according to claim 1, wherein said additional phase shift ϕ is obtained by lagging said signal Tx2 for a duration T2 and said signal Tx1 for a duration T1 so that the difference T2−T1, in absolute value, is between 12.9 nanoseconds (ns) and 16.8 ns.

11. The method according to claim 10, wherein said difference T2−T1, in absolute value, is equal to 15 ns.

12. A contactless transceiver device designed to remotely exchange data with a contactless portable object comprising a radiofrequency controller (11, 30, 40, 51) delivering two symmetrical digital signals Tx1 and Tx2 from a 13.56 MHz input signal emitted by a clock (31, 41), means to phase shift said two signals by 180 degrees in relation to one another when there is no information to transmit from the contactless transceiver device to the contactless portable object (idle state), and to phase shift said two signals in relation to one another by an additional angle ϕ, in absolute value, when there is information to transmit from the contactless transceiver device to the contactless portable object (modulated state), means to filter (13) said two signals Tx1 and Tx2, means for adding the two filtered signals Tx1*f* and Tx2*f* to obtain an amplitude modulated resultant signal radiated at the antenna at a modulation factor between 8% and 14%.

13. The device according to claim 12, wherein said means for phase shifting said two signals by an additional angle ϕ, in absolute value, comprise at least a logic lag stage (33, 53) designed to lag one of said signals in relation to the other by a duration T, in absolute value, between 12.9 nanoseconds (ns) and 16.8 ns.

14. The device according to claim 13, wherein the lag T is equal to 15 ns to obtain a modulation factor of 11%.

15. The device according to claim 13, wherein said phase shifting means comprise a multiplier circuit (44) designed to multiply the frequency of 13.56 MHz of the input signal by a factor n, the input signal being generated by a clock (41) of the RF controller (40), a frequency divider circuit (46) designed to divide the signal multiplied by the multiplier circuit into n signals shifted by 360/n degrees, a switch to select two signals Tx1 and Tx2 among the n signals such that Tx1 and Tx2 are shifted by 180 degrees when there is no information to transmit from the contactless device to the portable contactless object (idle state) and to select two other signals shifted by 180+ϕ degrees when there is information to transmit from the contactless transceiver device to the portable contactless object (modulated state).

16. The contactless device according to claim 15, wherein said factor n is equal to 10 and said two selected signals Tx1 and Tx2 have a phase of 72 degrees and 252 degrees when there is no information to be transmitted from the contactless transceiver device to the contactless portable object (idle state) and have a phase of 36 degrees and 288 degrees when there is information to be transmitted from the contactless transceiver device to the contactless portable object (modulated state).

17. The device according to claim 12, wherein said phase shifting means of said two signals are located directly in the RF controller (11, 30, 40) of the contactless transceiver device.

* * * * *